Dec. 29, 1970 L. R. RUDOLPH ET AL 3,551,850
SUPPRESSED-CARRIER MODULATOR
Filed Nov. 14, 1968
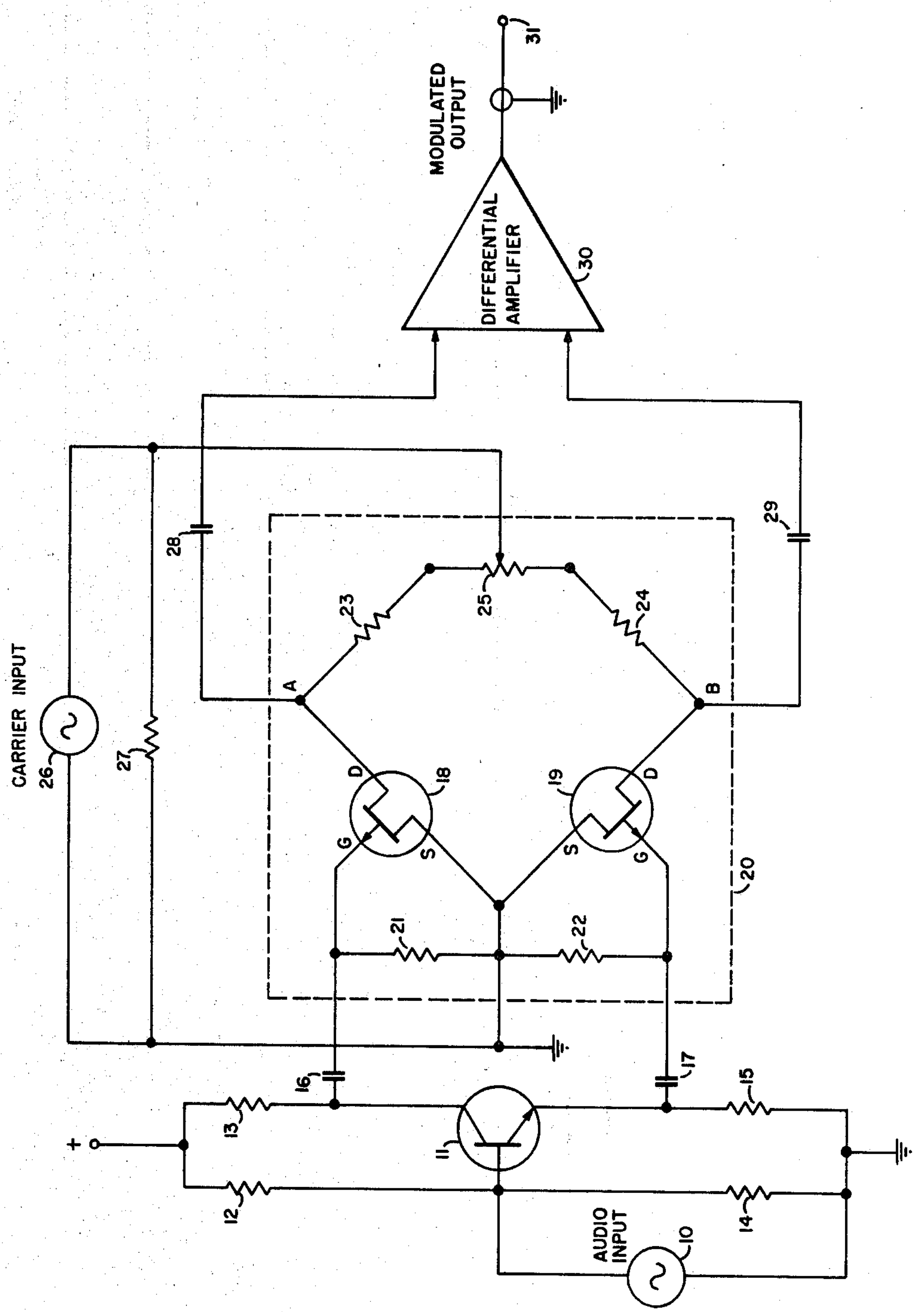
INVENTORS
LOUIS R. RUDOLPH
JOSEPH A. DALPEE
BY [signature]
ATTORNEY United States Patent Office 3,551,850
Patented Dec. 29, 1970

3,551,850
SUPPRESSED-CARRIER MODULATOR

Louis R. Rudolph, Annandale, Va., and Joseph A. Dalpee, Hyattsville, Md., assignors to the United States of America as represented by the Secretary of the Navy Filed Nov. 14, 1968, Ser. No. 775,839
Int. Cl. H03c *1/52*
U.S. Cl. 332—44 6 Claims

ABSTRACT OF THE DISCLOSURE

A transformerless suppressed-carrier modulator comprising a field-effect transistor bridge circuit which modulates a carrier frequency signal with two audio input signals, which differ in phase by 180°, to produce two modulated signals having carrier, upper sideband, and lower sideband components with polarities such that after subtraction by a differential amplifier the carrier components cancel and only the upper and lower sideband signals are fed to the output of the device.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in modulators and the like, and more particularly to a new and improved solid state suppressed-carrier modulator which uses no transformers.

When it is desired to send audio frequency information from one point to another via radio waves, the audio signals must be converted to radio frequency signals in order to effectuate proper transmission. One well known technique for accomplishing this is amplitude modulation. The process of amplitude modulation involves controlling the amplitude of the constant radio frequency carrier by the frequency of the audio information signal. The modulation process also produces two additional frequency components in addition to the audio frequency signal and the carrier; namely, an upper sideband component caused by the sum of the frequency of the carrier and audio signals, and a lower sideband component caused by the difference of the carrier and the audio signal frequencies.

In conventional a.m. communication, the audio signal is filtered out prior to transmission while the upper and lower sidebands as well as the carrier are transmitted. As is well know, a fully modulated a.m. signal has two-thirds of its power in the carrier and only one-third in the sidebands. Thus the carrier, which serves only to aid in the demodulation of the received signal, reduces the capabilities of the transmitter and necessitates the use of high transmission power.

Recognizing this limitation, designers have developed many different circuits which produce both a.m. sideband signals while suppressing the carrier. One of the more common devices is known as a ring modulator and usually consists of four diodes in a closed series bridge circuit. The device includes two transformers, one used to provide an input connection across one diagonal of the bridge and the other used to provide an output connection across the other diagonal. Although such ring modulators have served the purpose, they have not proved satisfactory under all conditions of service due to the fact that the transformers required are extremely large, especially in low frequency applications. This presents serious design problems where either space or weight specifications are critical. Furthermore, the overall frequency response of the device is, to a great extent, controlled by the transformer performance and is another limiting factor. In addition, the diodes used in the bridge circuit limit the carrier rejection capabilities of the device and can cause an undesirable amount of distortion.

SUMMARY OF THE INVENTION

The general purpose of this invention is to provide a suppressed carrier modulator which embraces all the advantages of similarly employed prior art devices and possesses none of the aforedescribed disadvantages. To attain this, the present invention utilizes a bridge type modulator which is adapted to simultaneously modulate both an audio input signal having no phase shift and the same audio signal with a 180° phase shift to produce two modulated signals, each having upper and lower sidebands. These signals are then fed to a differential amplifier where the instantaneous signal amplitudes of the various frequency components are subtracted to cancel the carrier component and produce a suppressed-carrier double-sideband modulated output signal.

In this circuit, the need for transformer coupling is obviated which, as a result, greatly improves the overall performance of the device. In addition, the removal of the transformers enables microminiaturization of the modulator at a saving of both size and weight. Furthermore, the use of field-effect transistors, which have an inherent linear relationship between transconductance and the magnitude of applied bias voltage, provides a substantial reduction in distortion.

Accordingly, it is one object of this invention to provide a suppressed-carrier modulator containing no transformers or inductive devices.

Another object is to provide a suppressed-carrier modulator having broad dynamic range.

A further object of the invention is the provision of a modulator having a high degree of carrier rejection.

Still another object is to provide a suppressed-carrier modulator which is readily adaptable to microminiaturization.

Yet another object of the provision of a suppressed-carrier modulator having a sinusoidal output which does not necessitate clipping or chopping the sinusoidal input waveforms.

BRIEF DESCRIPTION OF THE DRAWING

Other objects, advantages and novel features of the invention will become more fully apparent from the following detailed description of the preferred embodiment of the invention when considered in conjunction with the accompanying drawing wherein:

The figure shows a schematic diagram of the preferred embodiment of the invention.

DESCRIPTION OF THE PREFERRED EMBODIMENT

Referring now to the drawing, there is shown a source 10 of audio input signals which are fed to the base electrode of transistor 11 which together with biasing resistors 12, 13, 14 and 15 form a conventional one-stage transistor amplifier. Two amplified output signals are produced by transistor 11, one appearing at the collector electrode and the other appearing at the emitter electrode. These signals are identical in both amplitude and frequency but differ in phase by 180°.

The two amplified, out-of-phase audio input signals from the transistor amplifier 11 are then fed through coupling capacitors 16 and 17, respectively, to the gate electrodes G of field-effect transistors 18 and 19, respectively, of bridge circuit 20. The field-effect transistors 18 and 19 are selected so that their transconductance characteristics match. The source electrodes S of transistors 18 and 19 are connected to ground and through biasing resistors 21 and 22, respectively, to their respective gate electrodes G. The drain electrode D of transistor 18 is connected through the series connection of identical resistors 23 and 24, and potentiometer 25 to drain electrode D of transistor 19 and to complete the closed-loop series bridge circuit 20.

A source 26 of carrier frequency signals is connected across impedance matching resistor 27 and across one diagonal of the bridge circuit 20 from the wiper arm of potentiometer 25 to ground. Potentiometer 25 provides a means for balancing the bridge circuit.

Junctions A and B of the drain electrodes of transistors 18 and 19 and resistors 23 and 24, respectively, provide two output signals which are fed through their respective coupling capacitors 28 and 29 to the two input terminals of differential amplifier 30 which, in turn, provides the modulated double-sideband suppressed-carrier output signals to output terminal 31 to complete the circuit.

The operation of the device will now be explained. Audio source 10 supplies an audio signal which can be represented as a sinusoidal signal having a frequency equal to $p$ divided by $2\pi$ and a peak amplitude equal to $E_a$ or:

$$\text{Audio input}=E_a \cos pt$$

The amplified signals appearing at the collector and emitter electrodes, respectively, or transistor 11 can therefore be represented as:

$$A_{\text{collector}}=E_1 \cos pt$$

and $$A_{\text{emitter}}=E_1 \cos (pt+\pi)$$

where $E_1$=(amplifier gain). $E_a$ and $\pi$ is a 180° phase shift. Similarly, the carrier input from source 26 can be represented as a sinusoidal signal having a frequency equal to $w$ divided by $2\pi$ and a peak amplitude equal to $E_0$ or:

$$\text{Carrier input}=E_0 \cos wt$$

When the voltage on the gate electrodes G of transistors 18 and 19 is zero, the bridge circuit 20 is balanced. However, when the two opposite phased input signals are applied, the bridge becomes unbalanced and produces modulated signals which appear at points A and B, respectively, and as measured with respect to ground, can be represented as:

$$M_A=\underbrace{E_0 \cos wt}_{\text{carrier}}+\underbrace{\frac{1}{2}E_1 \cos (w+p)t}_{\text{upper sideband}}+\underbrace{\frac{1}{2}E_1 \cos (w-p)t}_{\text{lower sideband}}$$

and $$M_B=E_0 \cos wt+\frac{1}{2}E_1 \cos [(w+p)t+\pi] +\frac{1}{2}E_1 \cos [(w-p)t+\pi]$$

or $$M_B=\underbrace{E_0 \cos wt}_{\text{carrier}}-\underbrace{\frac{1}{2}E_1 \cos (w+p)t}_{\text{upper sideband}}-\underbrace{\frac{1}{2}E_1 \cos (w-p)t}_{\text{lower sideband}}$$

The differential amplifier output appearing at terminal 31, which is equal to $M_A-M_B$, then becomes:

$$\text{Output}=\underbrace{E_1 \cos (w+p)t}_{\text{upper sideband}}+\underbrace{E_1 \cos (w-p)t}_{\text{lower sideband}}$$

Thus, there is provided a simple, reliable circuit for producing a double-sideband suppressed-carrier signal which does not clip or chop the sinusoidal input signals and does not need transformer coupling.

It should be understood, of course, that the foregoing disclosure relates to only a preferred embodiment of the invention and that numerous modifications or alterations may be made therein in the light of the above teachings.

What is claimed and desired to be secured by Letters Patent of the United States is:

1. A suppressed-carrier modulator comprising:

a source of carrier frequency signals;

at least two resistors coupled at one end to said source of carrier frequency signals;

two field-effect transistors, each having a source electrode, a gate electrode, and a drain electrode, said source electrodes being coupled together to a point of reference potential, and each one of said drain electrodes being connected to the other end of a respective one of said resistors to form a first and a second junction, respectively;

a source of audio frequency signals;

an amplifier circuit coupled to said source of audio frequency signals for providing two amplified output signals differing in phase by 180°, each one of said two signals being directly coupled to a respective one of said two gate electrodes; and a differential amplifier having two inputs, each one directly coupled to a respective one of said first and second junctions, and an output, whereby said carrier frequency signal is modulated by said audio frequency signals to produce upper and lower sideband signals at the output of said differential amplifier free from said carrier frequency signal and said audio frequency signals.

2. The modulator of claim 1, further including:

a potentiometer having two end terminals and a wiper terminal, each one of said end terminals being connected to said one end of a respective one of said two resistors, and said wiper terminal being connected to said source of carrier frequency signals.

3. A suppressed-carrier modulator comprising:

a source of two audio signals having identical amplitude and frequency and differing in phase by 180°;

a source of carrier frequency signals;

a bridge modulator directly coupled to said source of audio signals and said source of carrier frequency signals for producing two modulated signals each including an identical carrier frequency component, an upper sideband component, and a lower sideband component, said upper and lower sideband components of one of said two modulated signals being 180° out of-phase with said upper and lower sideband components of the other of said two modulated signals; and a differential amplifier having two inputs directly coupled to said bridge modulator for receiving said two modulated signals, respectively, and an output, whereby said carrier frequency components of said two modulated signals are cancelled, and the respective upper and lower sideband components of the two modulated signals are combined by said differential amplifier and appear at said output free from both said carrier signals and said audio signals.

4. The modulator of claim 3, wherein said bridge modulator includes:

at least two resistors coupled together at one end to said source of carrier frequency signals; and two field-effect transistors, each having a source electrode, a drain electrode, and a gate electrode, said source electrodes being coupled together to a point of reference potential and each one of said gate electrodes being directly coupled to said source of two audio signals to thereby receive a respective one of said two audio signals, and each one of said drain electrodes being connected to the other end of a respective one of said two resistors to form two junctions for providing said two modulated signals.

5. The modulator of claim 4, further including:

a potentiometer having two end terminals and a wiper terminal, each one of said end terminals being connected to said one end of a respective one of said two resistors, and said wiper terminal being connected to said source of carrier frequency signals.

6. The modulator of claim 5 wherein said source of two audio signals comprises an audio signal applied to a transistor and four resistors forming a one-stage transistor amplifier.

References Cited

UNITED STATES PATENTS

| | | | |
|---|---|---|---|
| 2,948,862 | 8/1960 | Brock | 332—47 |

| | | | |
|---|---|---|---|
| 3,229,230 | 1/1966 | Feldman | 332—43X |
| 3,435,375 | 3/1969 | Miller, Jr. | 332—47X |
| 3,484,723 | 12/1969 | Rypkema | 332—43X |

ROY LAKE, Primary Examiner

L. J. DAHL, Assistant Examiner

U.S. Cl. X.R.

332—47